United States Patent
Kuwana

(10) Patent No.: US 8,335,548 B2
(45) Date of Patent: Dec. 18, 2012

(54) COMMUNICATION APPARATUS AND METHOD OF CONTROLLING SAME

(75) Inventor: Ichiro Kuwana, Nerima-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1087 days.

(21) Appl. No.: 11/757,702

(22) Filed: Jun. 4, 2007

(65) Prior Publication Data

US 2007/0293223 A1    Dec. 20, 2007

(30) Foreign Application Priority Data

Jun. 16, 2006    (JP) .................................. 2006-168116

(51) Int. Cl.
*H04B 1/38*    (2006.01)

(52) U.S. Cl. .................. 455/574; 455/127.5; 455/436; 455/343.1; 455/343.5; 455/127.1

(58) Field of Classification Search ................. 455/126, 455/436, 426.1, 444, 343.5, 574, 127.5, 127.1, 455/343.1; 370/252, 338
See application file for complete search history.

(56) References Cited

U.S. PATENT DOCUMENTS

| | | | | |
|---|---|---|---|---|
| 6,381,467 | B1 * | 4/2002 | Hill et al. ...................... | 455/519 |
| 6,501,968 | B1 * | 12/2002 | Ichimura ....................... | 455/574 |
| 6,973,335 | B2 * | 12/2005 | Ganton ......................... | 455/573 |
| 6,980,522 | B2 | 12/2005 | Boyle | |
| 7,164,887 | B2 * | 1/2007 | Tanada et al. ................ | 455/41.2 |
| 7,356,360 | B2 * | 4/2008 | Katayama et al. ............ | 455/574 |
| 7,624,290 | B2 * | 11/2009 | Iwamura et al. ............. | 713/320 |
| 2001/0012757 | A1 * | 8/2001 | Boyle .......................... | 455/11.1 |
| 2003/0040316 | A1 * | 2/2003 | Stanforth et al. ............. | 455/445 |
| 2003/0045295 | A1 * | 3/2003 | Stanforth ..................... | 455/445 |
| 2003/0190938 | A1 * | 10/2003 | Ganton ......................... | 455/574 |
| 2003/0195019 | A1 * | 10/2003 | Litwin .......................... | 455/574 |
| 2004/0198358 | A1 * | 10/2004 | Kim et al. .................... | 455/436 |
| 2005/0059420 | A1 * | 3/2005 | Salokannel et al. .......... | 455/522 |
| 2005/0075084 | A1 * | 4/2005 | Salokannel et al. .......... | 455/126 |
| 2006/0189359 | A1 * | 8/2006 | Kammer et al. .............. | 455/574 |
| 2007/0152638 | A1 * | 7/2007 | Deprun ......................... | 320/134 |
| 2007/0201381 | A1 * | 8/2007 | Ekl et al. ...................... | 370/254 |

FOREIGN PATENT DOCUMENTS

| | | |
|---|---|---|
| JP | 10-145276 A | 5/1998 |
| JP | 10-308697 | 11/1998 |
| JP | 2002-101166 | 4/2002 |
| JP | 2002-280925 | 9/2002 |
| JP | 2003134040 A | 5/2003 |
| JP | 2003-526251 | 9/2003 |

OTHER PUBLICATIONS

Japanese Office Action for Application No. 2006-168116 dated Dec. 9, 2011.
Japanese Office Action for Counterpart Japanese Application No. 2006-168116 dated Jun. 15, 2012.

* cited by examiner

*Primary Examiner* — Kamran Afshar
*Assistant Examiner* — Mong-Thuy Tran
(74) *Attorney, Agent, or Firm* — Carter, DeLuca, Farrell & Schmidt LLP

(57) ABSTRACT

When a communication apparatus is operating as a control station on a network, control is exercised so as to handover the control station when it is recognized that the status of the power supply of another communication apparatus participating in this network is indicative of commercial power. Recognition is performed by receiving information, which requests handover of the control station, from the other communication apparatus whose power-supply status is indicative of commercial power.

21 Claims, 14 Drawing Sheets

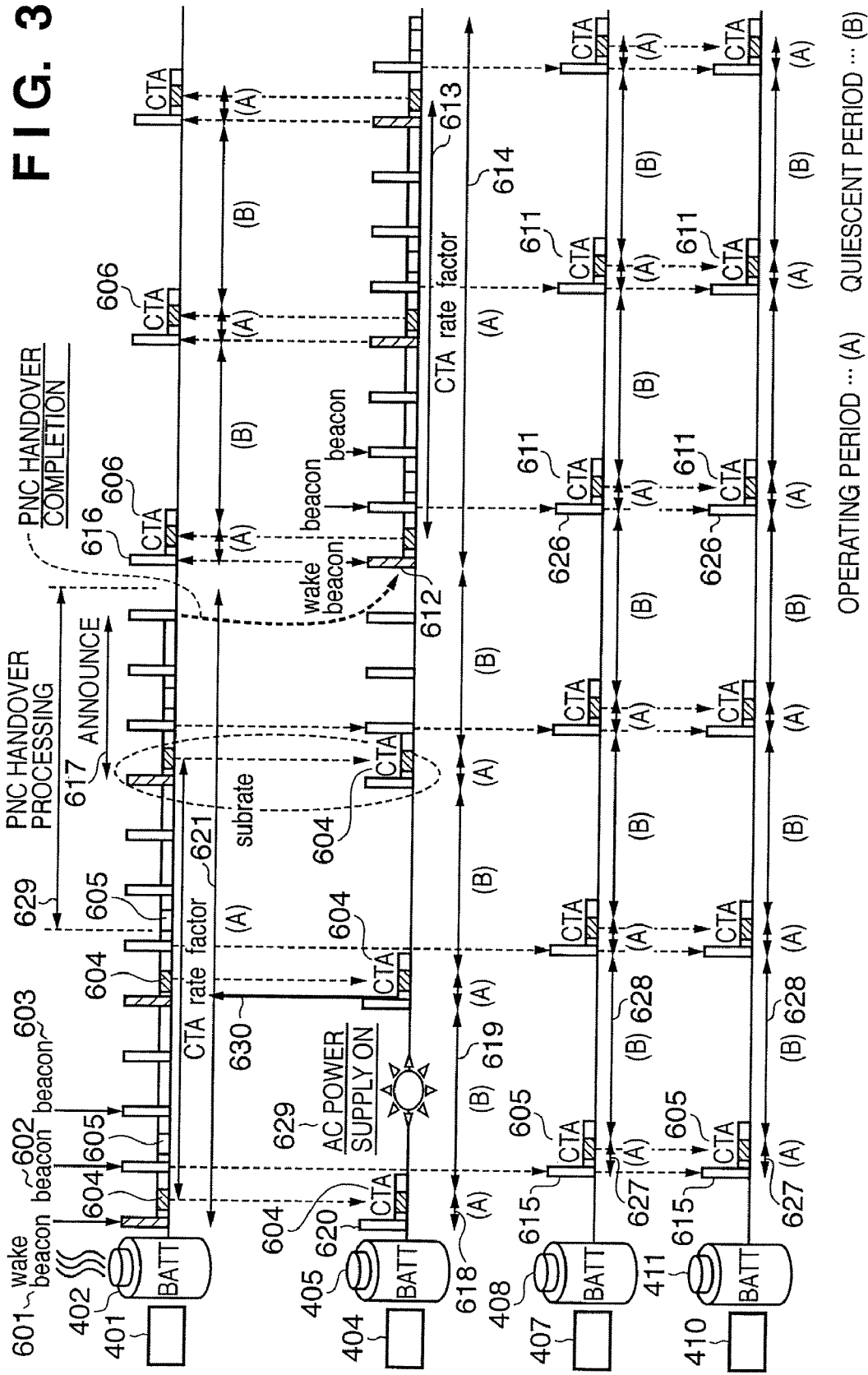

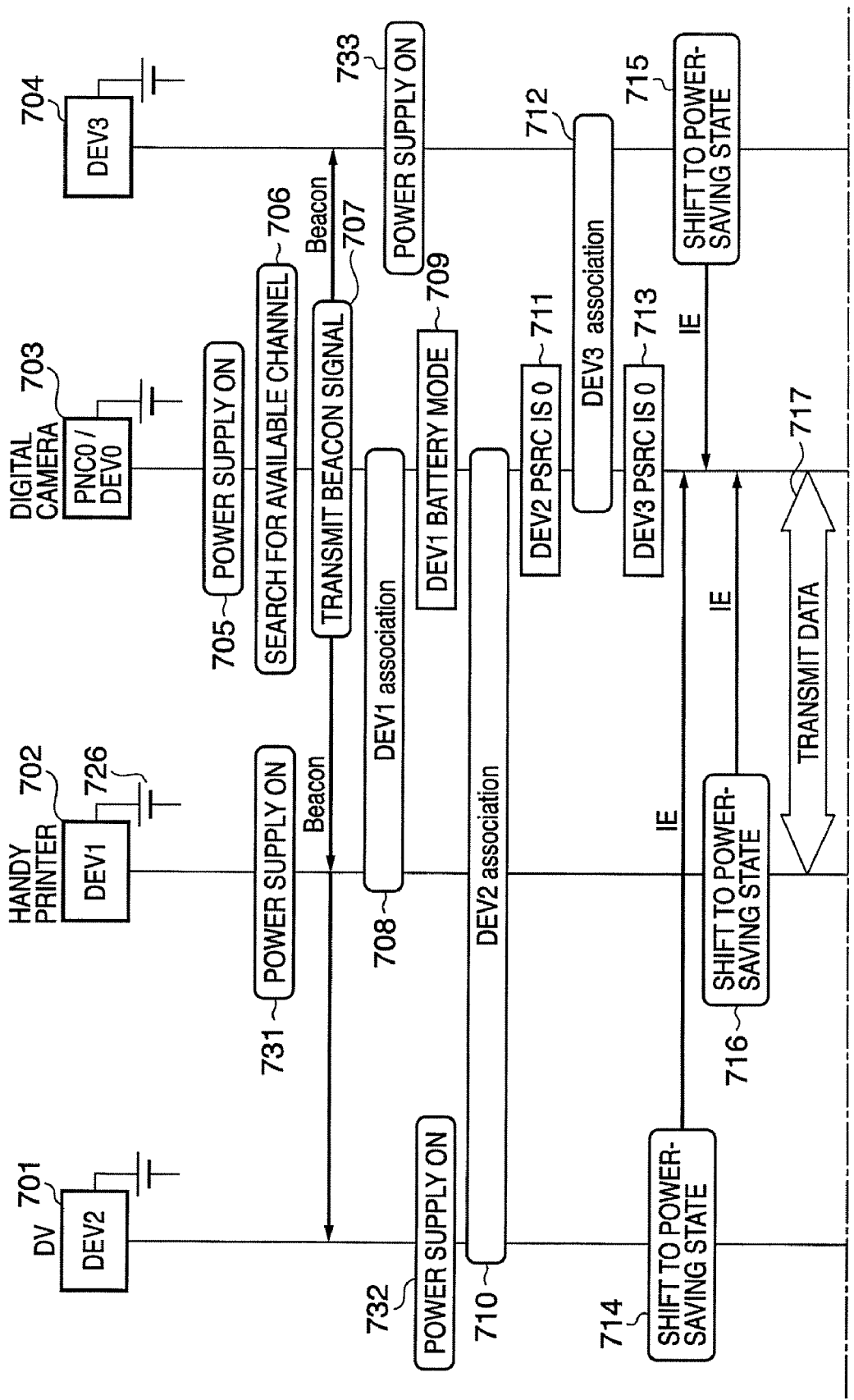

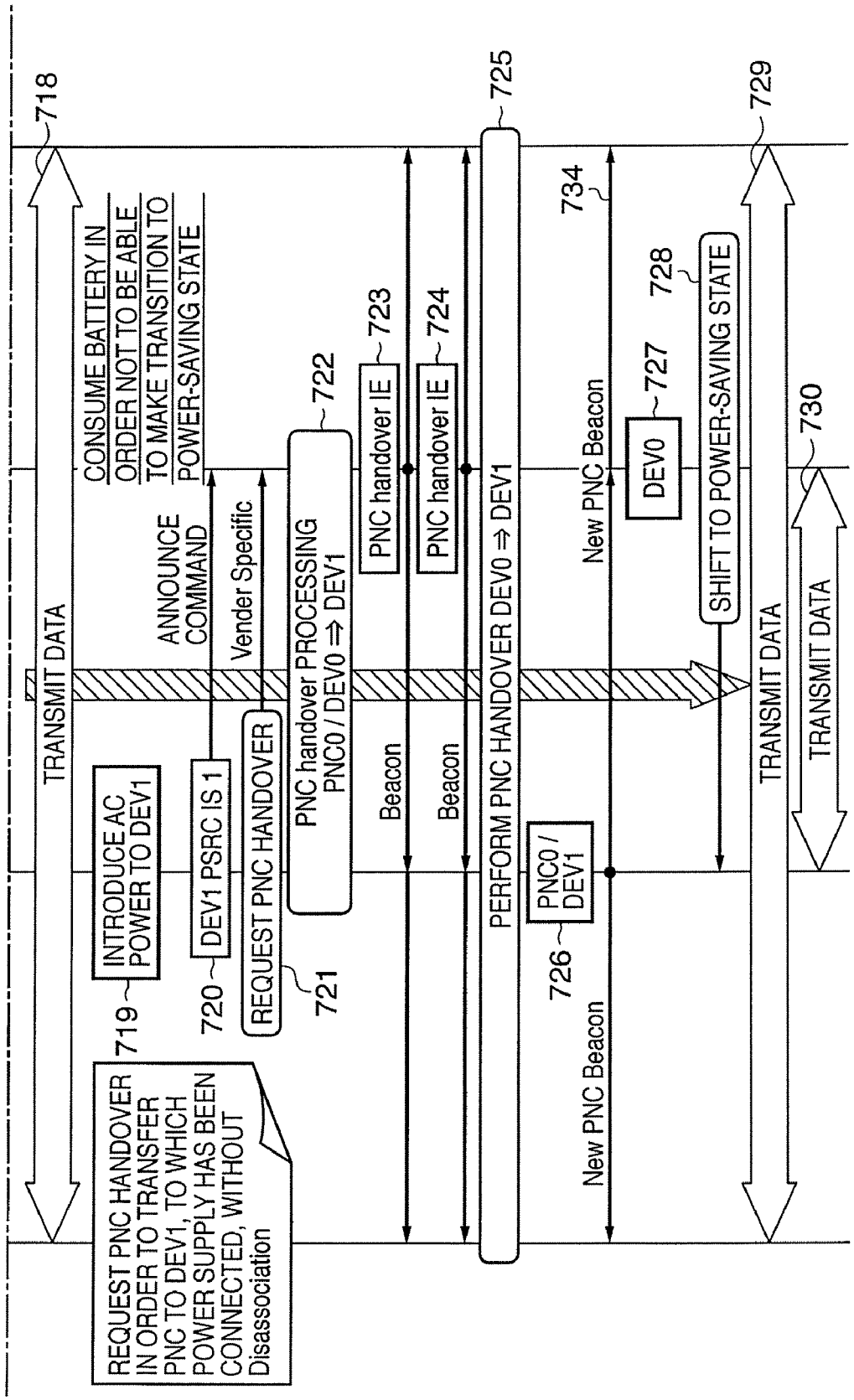

FIG. 5

| Order | Information | Note |
|---|---|---|
| 1 | PNC Des-mode bit in PNC capabilities field | PNC Des-mode=1 is preferred |
| 2 | SEC bit in PNC capabilities field | SEC=1 is preferred |
| 3 | PSRC bit in PNC capabilities field | PSRC=1 is preferred |
| 4 | Max associated DEVs | Higher value is preferred |
| 5 | Max CTRqBs | Higher value is preferred |
| 6 | Transmitter power level (PHY dependent) | Higher value is preferred |
| 7 | MAX PHY rate (PHY dependent) | Higher value is preferred |
| 8 | DEV address | Higher value is preferred |

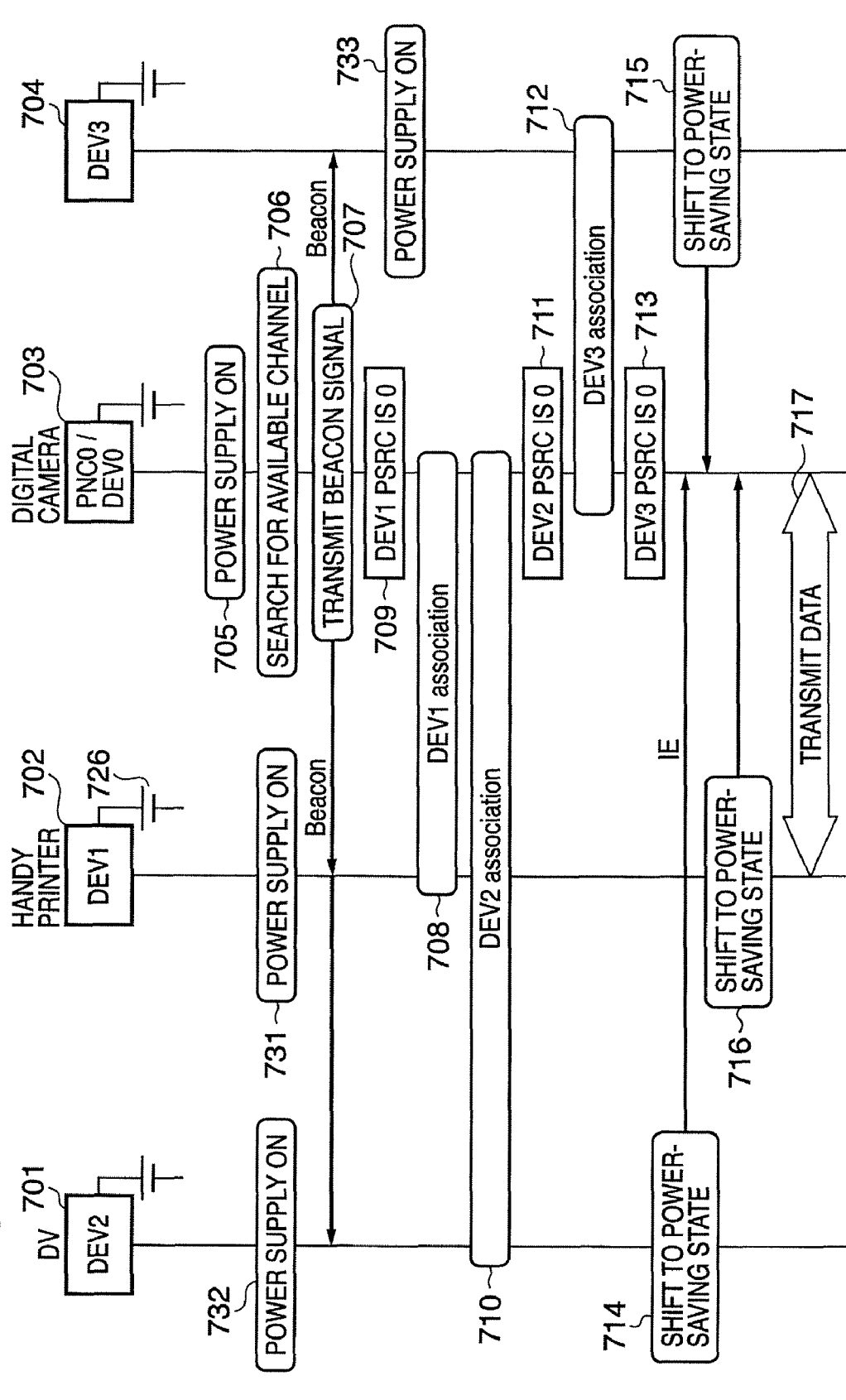

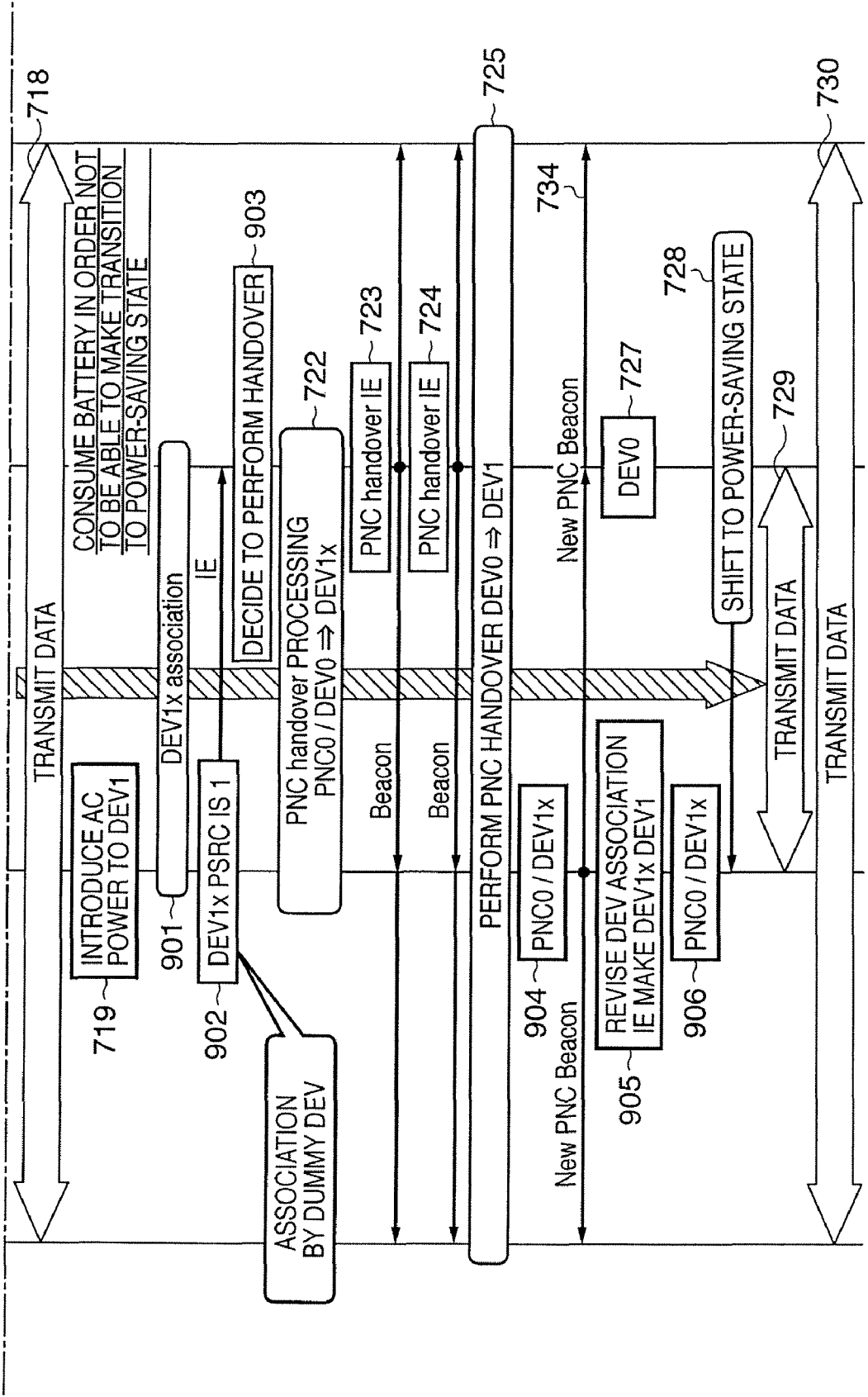

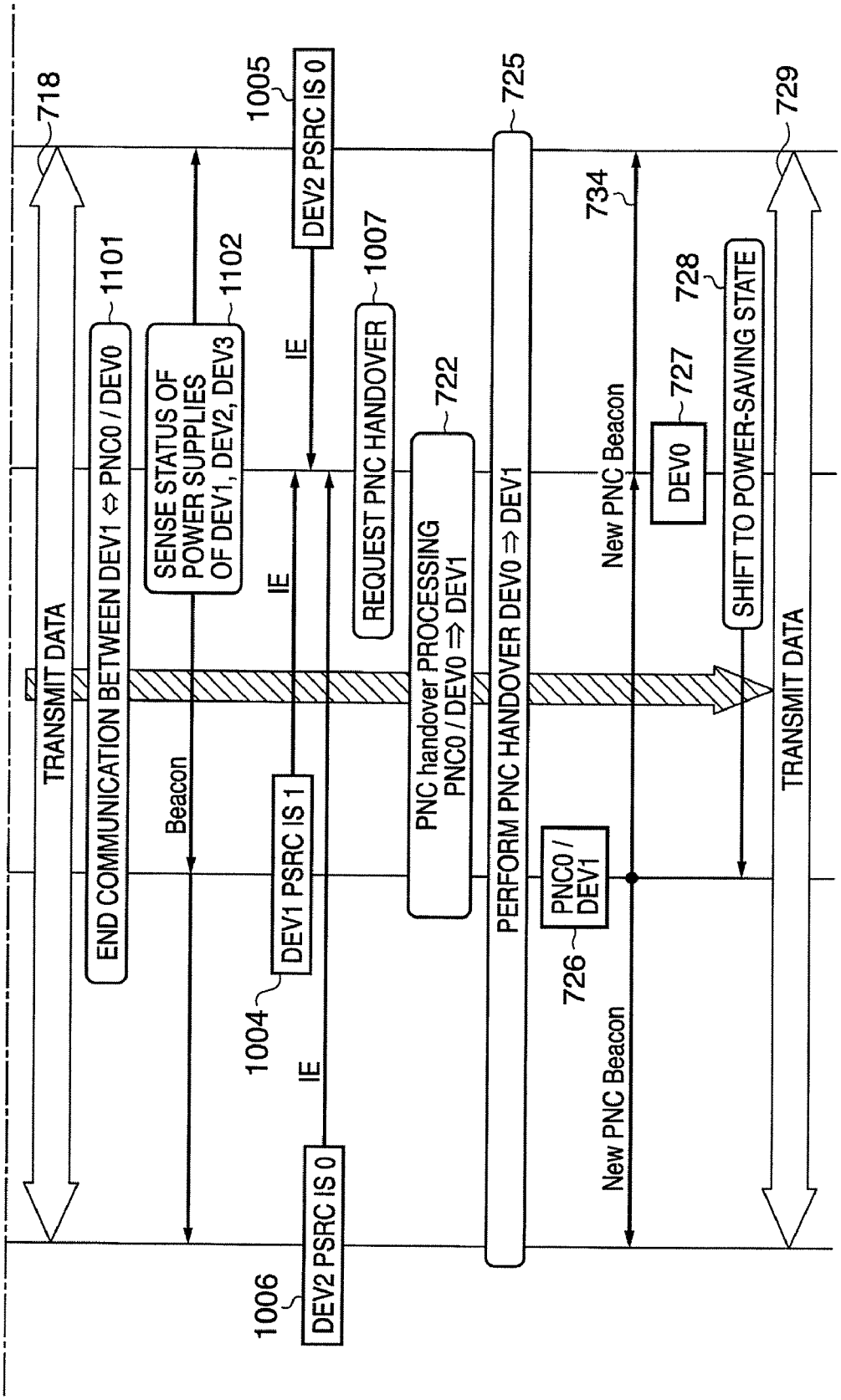

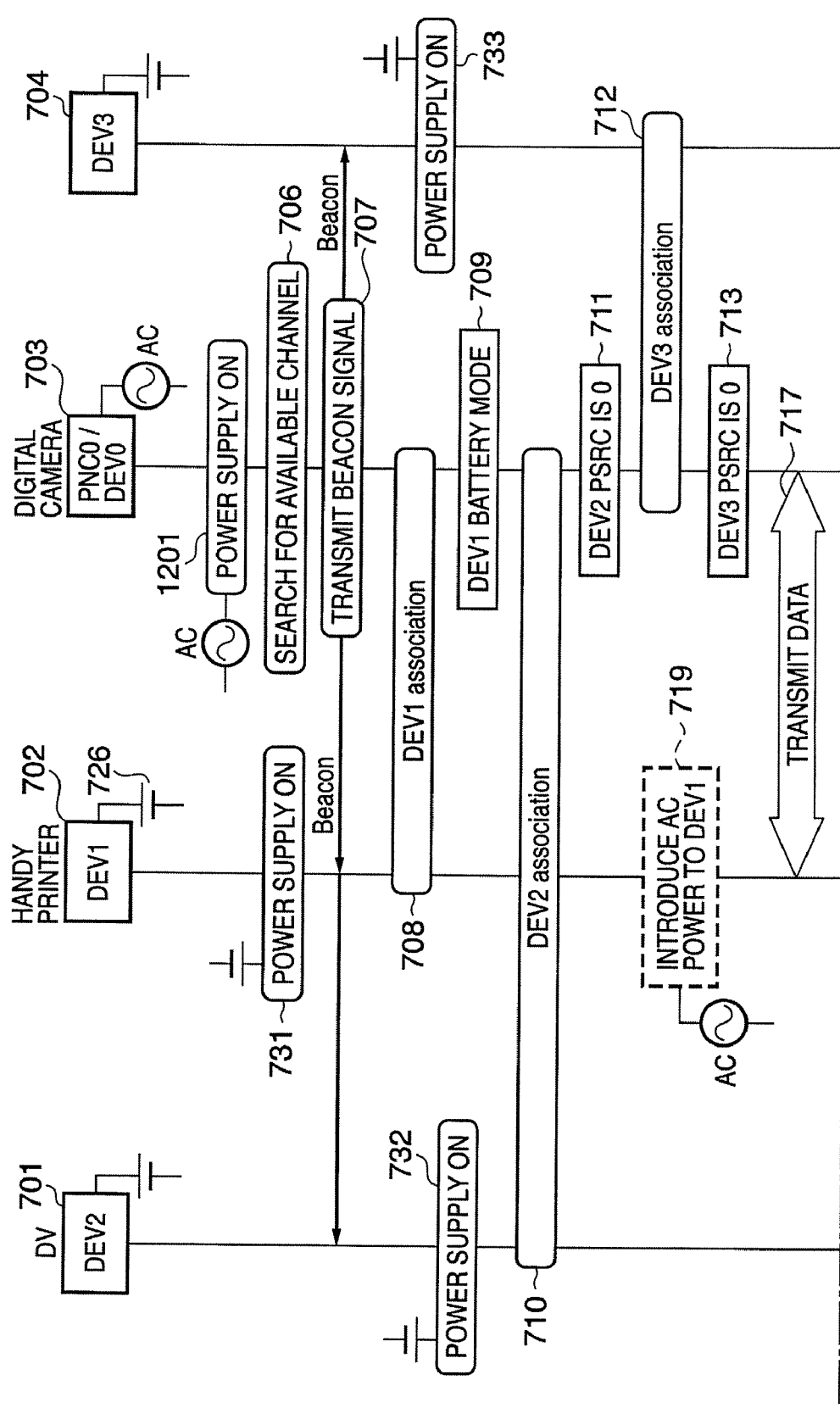

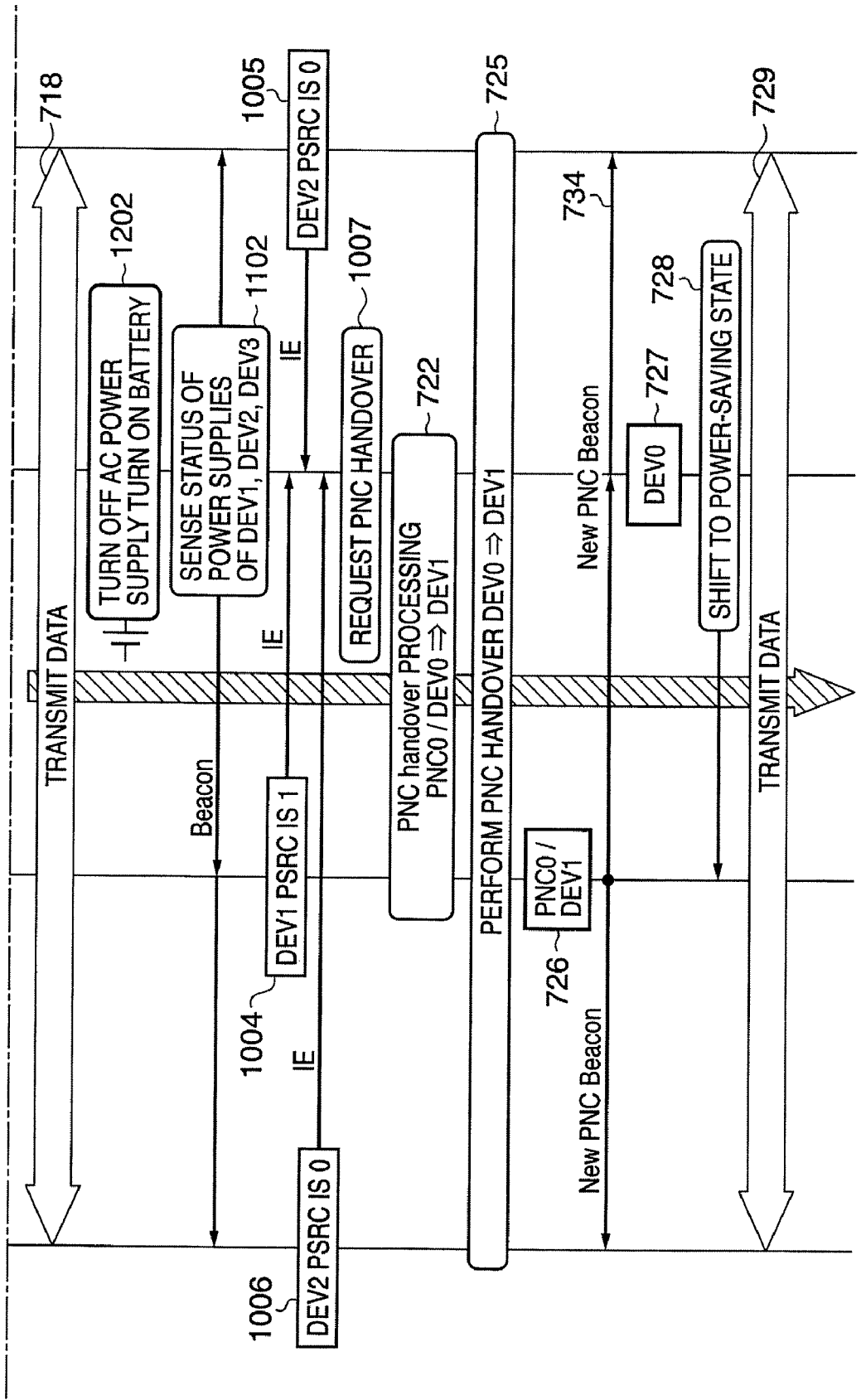

COMMUNICATION APPARATUS AND METHOD OF CONTROLLING SAME

BACKGROUND OF THE INVENTION

1. Field of the Invention

The present invention relates to a communication apparatus and method of controlling same in which handover of a control station in a network is performed in accordance with the state of the power supply of the communication apparatus.

2. Description of the Related Art

In conventional communication systems compliant with IEEE 802.15.3, a single wireless terminal serves as a control station (master) and controls a plurality of other wireless terminals (slaves), thereby constructing a piconet. A single piconet uses the same channel, and communication is assigned to respective time slots obtained by time division. Each wireless terminal is notified by a beacon signal transmitted by the control station, and the piconet operates in such a manner that the wireless terminals communicate with one another. The wireless terminals therefore communicate with one another directly based upon the beacon signal received.

A wireless terminal may function as both a control station and a wireless terminal. In ordinary operation, therefore, the wireless terminal to which power is introduced first searches for and acquires an available channel and then transmits the beacon signal to thereby start the construction of the network. The other wireless terminals receive the beacon signal from the control station and attempt to associate, as a result of which a piconet is formed.

In order to minimize consumption of a battery in the case of a wireless terminal (slave) powered by a battery, the wireless terminal transitions to a power-saving mode in which it receives the beacon signal at a rate of once every several number of transmissions and operates intermittently only at the timing of a time slot that has been allocated to it for the purpose of communication.

The IEEE 802.15.3 standard is such that if a new wireless terminal has become associated with the network, this wireless terminal undergoes a functional comparison and the control operation can be handed over to this new wireless terminal. However, after one control station and multiple 1 to N wireless terminals constructing a piconet have completed association, the capabilities of these wireless terminals are not compared and handover of the control station is not carried out.

Since the wireless terminal operating as the control station constantly transmits a beacon, receives various requests and information from each of the other wireless terminals and monitors status such as interference, power consumption by this terminal is severe. Hence there is the likelihood that communication will be interrupted owing to consumption of the battery. A further problem is that in response to shutdown of the wireless terminal serving as the control station, the beacon from the control station ceases being transmitted, communication among all of the wireless terminals that are communicating over the piconet of the control station is interrupted and continuation of communication becomes impossible.

SUMMARY OF THE INVENTION

The present invention prevents interruption of communication due to cut-off of power when a wireless terminal is operating as a control station in a network.

In accordance with an aspect of the present invention, there is provided a communication apparatus comprising: a recognition device configured to, in a case where the communication apparatus is operating as a control station of a network, recognize the type of power supply of another communication apparatus participating in the network; and a handover device configured to execute processing for handing over the control station based upon recognition by the recognition device.

In accordance with another aspect of the present invention, there is provided a method of controlling a communication apparatus, comprising: a recognition step of, in a case where the communication apparatus is operating as a control station of a network, recognizing the type of power supply of another communication apparatus participating in the network; and a handover step of executing processing for handing over the control station to the other communication apparatus based upon recognition in the recognition step.

Further features of the present invention will become apparent from the following description of exemplary embodiments (with reference to the attached drawings).

BRIEF DESCRIPTION OF THE DRAWINGS

FIG. 3 is a timing chart illustrating control-station handover processing according to the first embodiment;

FIGS. 4A and 4B are diagrams illustrating the sequence of PNC handover processing between wireless terminals according to the first embodiment;

FIG. 5 is a diagram illustrating the capabilities (information) of a local station relating to wireless communication;

FIGS. 6A and 6B are diagrams illustrating the sequence of PNC handover processing among wireless terminals according to a second embodiment of the present invention;

FIGS. 8A and 8B are diagrams illustrating the sequence of PNC handover processing among wireless terminals according to a fourth embodiment of the present invention; and FIGS. 9A and 9B are diagrams illustrating the sequence of PNC handover processing among wireless terminals according to a fifth embodiment of the present invention.

DESCRIPTION OF THE EMBODIMENTS

Preferred embodiments of the present invention will now be described in detail with reference to the drawings.

First Embodiment

In processing according to a first embodiment of the invention, the wireless terminal of a control station (PNC) being driven by a battery performs handover to another wireless terminal to which AC power (commercial power) has been introduced and which has started operating using the AC power supply, whereby data communication is allowed to continue. This processing will be described.

Figure 1:
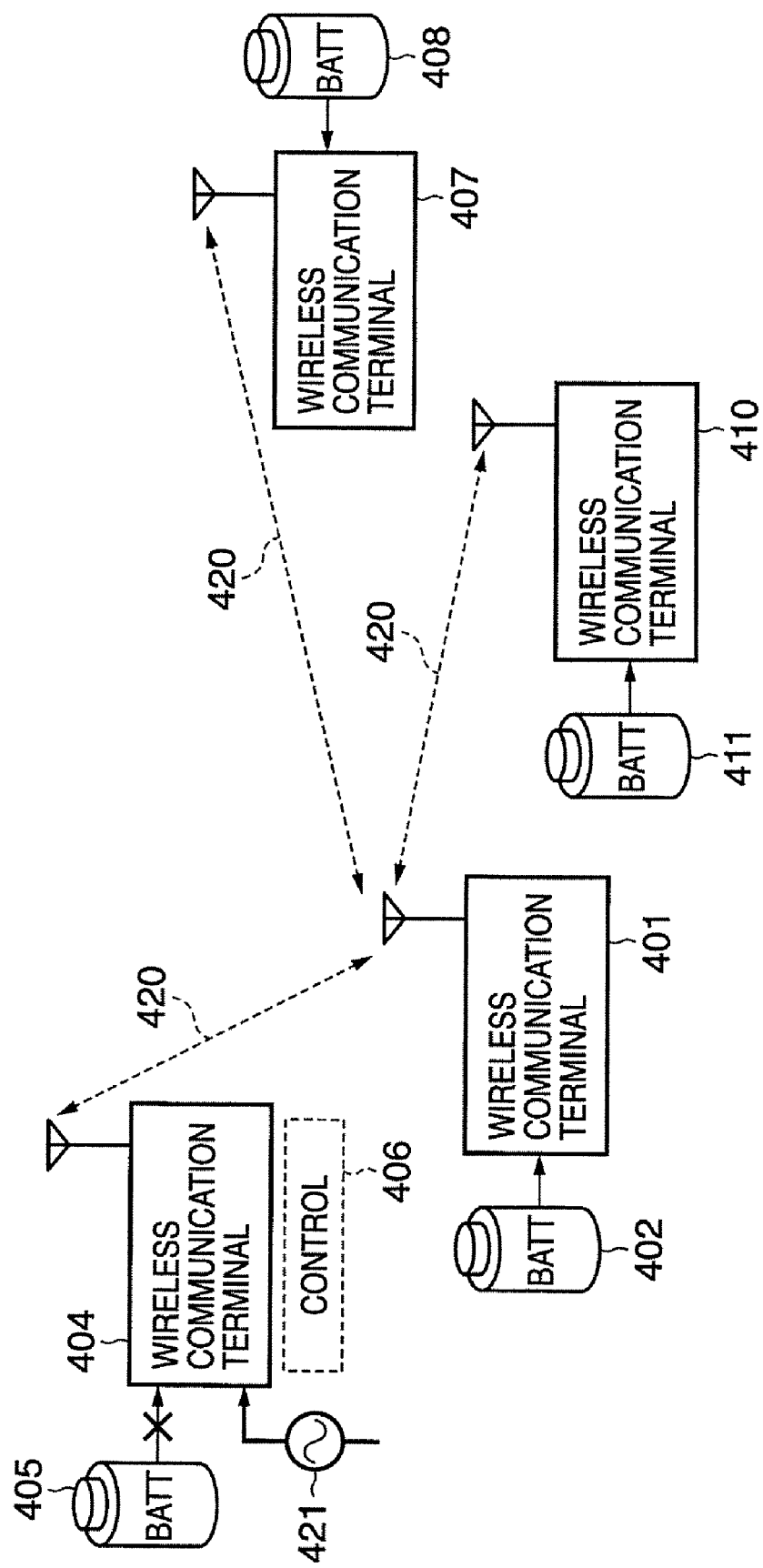
FIG. 1 is a diagram illustrating an example of the configuration of a communication system according to a first embodiment of the present invention.

FIG. 1 is a diagram illustrating an example of the configuration of a communication system in the first embodiment. The system shown in FIG. 1 includes wireless terminals 401, 404, 407 and 410 to communicate signals 420 wirelessly. Batteries 402, 405, 408 and 411 are for operating the wireless terminals 401, 404, 407 and 410, respectively. The wireless terminal 404 is equipped with an AC power supply 421 in addition to the battery 405.

Figure 2:
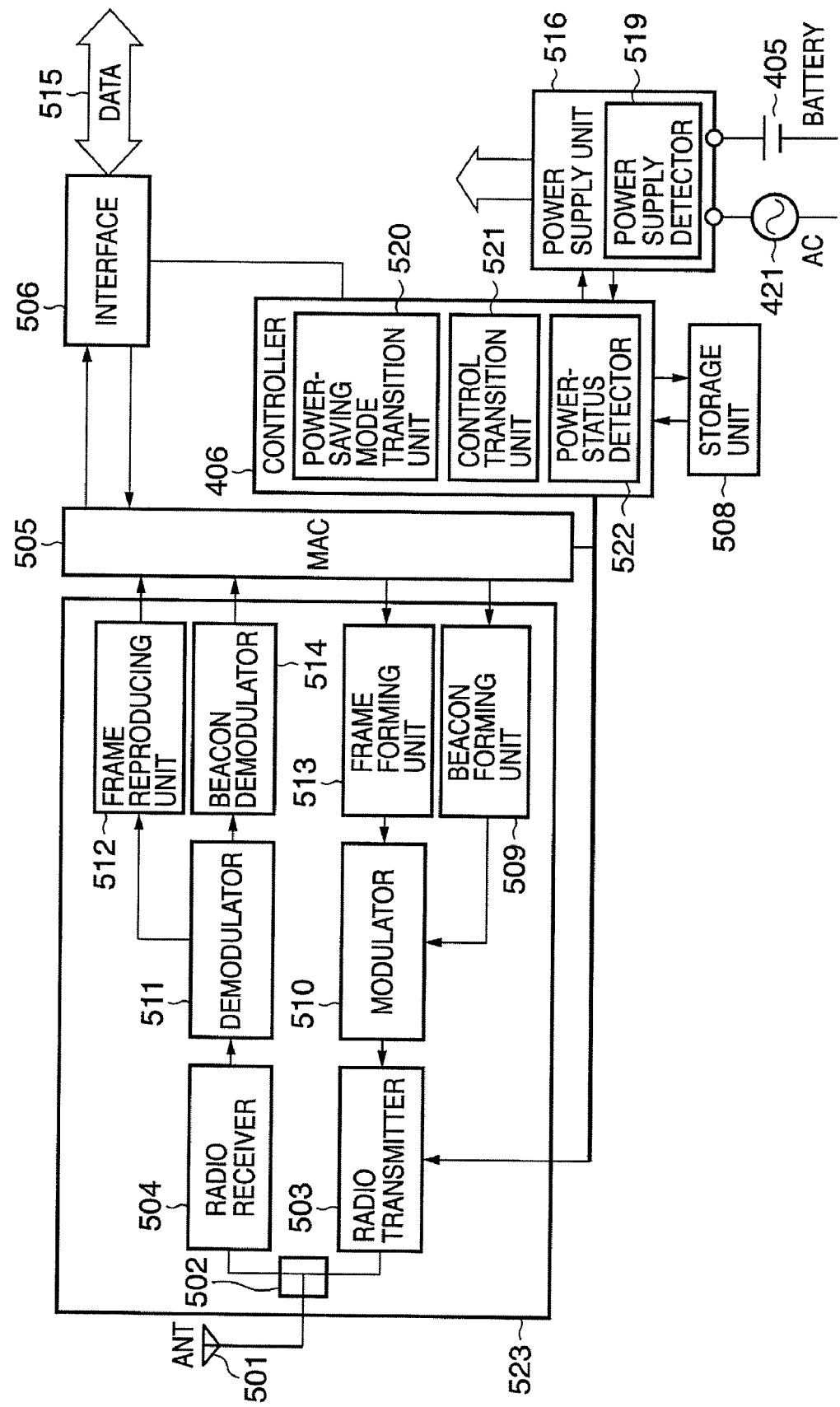
FIG. 2 is a block diagram illustrating an example of the structure of a wireless terminal according to the first embodiment.

FIG. 2 is a block diagram illustrating an example of the structure of a wireless terminal according to the first embodiment. It should be noted that although FIG. 2 illustrates an example of the structure of the wireless terminal 404 shown in FIG. 1, the other wireless terminals 401, 407, 410 have the same structure but do not have an AC power supply connected to their power supply units.

As illustrated in FIG. 2, a power supply unit 516 is capable of being driven by an AC power supply 421 or battery 405. Which of these has been connected is detected by a power supply detector 519. It should be noted that even if, in a case where the battery 405 has been connected, the AC power supply 421 is connected, then the wireless terminal is controlled so as to be operated by the AC power supply 421 and the battery 405 is charged.

A controller 406 has a power-status detector 522 for sensing the status of the power supply of another wireless terminal by communicating wirelessly with the other wireless terminal. Further, the controller 406 further includes a control transition unit 521 for changing over whether the wireless terminal is to operate as a control station (master) or as a slave, and a power-saving mode transition unit 520 which, in a case where the wireless terminal is operating as a slave, causes a MAC unit 505 to shift to a power-saving mode. Further, a storage unit 508 in which various control information is stored in advance has been connected to the controller 406.

A radio unit 523 is connected to an antenna 501 and is adapted so as to communicate wirelessly. A receive signal received from the antenna 501 is processed by a radio receiver 504, demodulator 511, frame reproducing unit 512 and beacon demodulator 514 via an antenna changeover switch 502, and the processed signal is sent to the MAC unit 505. The MAC unit 505 outputs data 515 via an interface 506.

A beacon signal and data frame generated by the MAC unit 505 is subjected to data processing as a transmit signal by a beacon forming unit 509, frame forming unit 513, modulator 510 and radio transmitter 503. The resultant signal is transmitted from the antenna 501 through the antenna changeover switch 502.

FIG. 3 is a timing chart illustrating control-station handover processing according to the first embodiment. The wireless terminal 401 of the control station being driven by the battery 402 transmits beacon signals 601 to 603 every fixed-interval superframe and notifies the wireless terminals 404, 407, 410 of time slots (CTA) 604, 605 for communication. In this example, the wireless terminals 401, 404 perform communication using the CTA 604 indicated by the beacon signal 601, and the wireless terminals 407, 410 perform communication using the CTA 605 indicated by the beacon signal 602.

In this case, the wireless terminal 404 need only receive the beacon signal 601 and obtain the information of CTA 604 from a receive signal 620. If the wireless terminal 404 operates only in an operating period 618, therefore, communication will not be impeded. That is, by ceasing to operate in a quiescent period 619, there is a reduction in the consumption of the battery 405 by the wireless terminal 404.

Further, in a manner similar to that of the wireless terminal 404, the wireless terminals 407, 410 receive the beacon signal 602 and perform communication using the CTA 605 acquired from a receive signal 615. Therefore, the wireless terminals 407, 410 need only operate in an operating period 627 and cease operating in a quiescent period 628. Thus, power-saving operation in which consumption of the batteries 408, 410 is reduced is possible.

However, since the wireless terminal 401 operating as the control station must continue transmitting the beacon signals 602, 603 even at times other than when it itself is communicating, a continuous-operation period 621 is required and consumption of the battery 402 is severe.

If power from the AC power supply 421 is introduced to the wireless terminal 404, the latter notifies the wireless terminal 401 of introduction of AC power using means such as an information element or announce command. By being so notified, the wireless terminal 401 recognizes that handover of the control station is possible and executes processing 629 for handing over control to the wireless terminal 404.

In the processing 629, the wireless terminal 401 sends to the wireless terminal 404 the control-station time slot information and information concerning the wireless terminals 407, 410 with which it is presently associated, and notifies the wireless terminal 404 of beacon-signal handover timing. More specifically, the wireless terminal 401 notifies the wireless terminal 404 (announce 617) of up to what number beacon signal it will transmit.

Next, upon receiving this information, the wireless terminal 404 starts operating as the control station and begins transmitting a beacon signal 612 as that of a new control station (master) at the timing of the next beacon transmission that follows cessation of the beacon signal from the wireless terminal 401, namely the old control station.

On the other hand, the wireless terminal 401 that was the master until now starts operating as a slave. However, data communication being performed between the wireless terminal 401 and the wireless terminal 404 that is the new control station continues without interruption.

Further, in a case where the wireless terminal 401 cannot receive the beacon signal from the wireless terminal 404 serving as the new control station, the wireless terminal 401 can communicate for a fixed period of time. If this period of time elapses, however, the wireless terminal 401 can no longer communicate. In a case where the wireless terminal 401 cannot receive the beacon signal from the wireless terminal 404 serving as the new control station, therefore, it again starts operating as the control station before the fixed period of time elapses.

FIGS. 4A and 4B are diagrams illustrating the sequence of processing for performing control-station handover between wireless terminals in the first embodiment. In an initial state, a wireless terminal 703 mounted in a digital camera starts operating under battery drive (POWER ON at 705) and, while changing the receive channel, conducts a search (706) for a beacon signal from the network to which this station is to be connected. If the result of the search is that the beacon signal cannot be detected, then, in order to construct a piconet itself, the wireless terminal 703 starts transmitting a beacon signal at 707 and subsequently transmits beacon signals at a superframe period decided in advance by the IEEE 802.15.3 standard. As a result, each wireless terminal is notified of control information for the purpose of communication.

In the example illustrated in FIGS. 4A and 4B, the wireless terminals 702, 701, 704 have their power supplies turned ON (731, 732, 733, respectively) and start receiving around the time of the beacon signal 707. If the wireless terminals 702, 701, 704 receive the beacon signal 707 and sense the presence of the wireless terminal 703, then these wireless terminals operate as slaves and request the wireless terminal 703 of the control station for association (708, 710, 712, respectively). Accordingly, the wireless terminals 702, 701, 704 transmit their own wireless communication capabilities as information 801 shown in FIG. 5. The information 801 contains information (PSRC) 802 relating to the power supply so that the wireless terminal 703 serving as the control station can ascertain the status of the power supply of each of the wireless terminals 702, 701, 704 (709, 711, 713, respectively). The PSRC signifies battery drive when it is "0" and AC power when it is "1".

Next, when association (708, 710, 712) is completed, the wireless terminals 702, 701, 704 transition together to the power-saving state in order to reduce power consumption (714, 715, 716, respectively). The wireless terminals then perform data communication (717, 718) with one another. However, the wireless terminal 703 operating as the control station cannot make the transition to the power-saving state.

If AC power is now introduced (719) to the wireless terminal 702, wireless terminal 702 notifies the wireless terminal 703 of the control station of the change in the status of the power supply (PSRC=1, which means a shift from the battery to the AC power supply (720).

In response to such notification, the wireless terminal 703 operating as the control station starts processing (722) for handover to the wireless terminal 702. More specifically, the wireless terminal 703 transmits notification of control station handover (PNC handover IE), inclusive of beacon signals, to the wireless terminals 701, 704 (723, 724) and gives notification of changeover of the control station (725). From this point onward, the wireless terminal 702 starts operating as the control station (726) and starts transmitting a beacon signal 734.

Further, the wireless terminal 703 that was operating as the control station is capable of operating as a slave (727) and of shifting to the power-saving state (728). As a result, data communication among operating wireless terminals (729, 730) is capable of continuing without interruption.

Second Embodiment

Next, a second embodiment according to the present invention will be described in detail with reference to the drawings.

Processing according to the second embodiment is such that in a case where a wireless terminal operating as a slave is changed over from a battery to an AC power supply, association is performed by a dummy wireless terminal and the master wireless terminal decides handover. This processing will be described.

The structure of a wireless terminal in the second embodiment is similar to that of the first embodiment described above with reference to FIGS. 1 and 2 and need not be described again.

FIGS. 6A and 6B are diagrams illustrating the sequence of processing for performing control-station handover between wireless terminals in the second embodiment. Reference characters identical with those in FIGS. 4A and 4B used in the first embodiment are employed in FIGS. 6A and 6B as well.

As in the first embodiment, the wireless terminals 702, 701, 704 associate with the wireless terminal 703 driven by the battery and operating as the control station (708, 710, 712, respectively). If AC power is introduced (719) to the wireless terminal 702 that is performing data communication (717, 718), the wireless terminal 702 attempts artificially to associate itself (901) anew as a dummy wireless terminal 702x. At the time of such association (901), the terminal sets PSRC to 1 as new power-supply information in the information 801 of FIG. 5 and transmits this information (902), whereby the wireless terminal 703 of the control station decides handover (903) and starts processing (722) for handing over the control station.

It should be noted that the sequence from handover processing to change in control station (722 to 725)) is the same as in the first embodiment except for the fact that the wireless terminal 702 is the dummy wireless terminal 702x.

When the control station is changed over, the dummy wireless terminal 702x starts operating as the control station (904) and starts to transmit a beacon signal 734. In this case, the dummy wireless terminal 702x is the wireless terminal 702. Since the radio unit is shared, handover of the control station from the dummy wireless terminal 702x to the wireless terminal 702 is performed again and the dummy wireless terminal 702x engages in disassociation (905) by internal processing. As a result, the wireless terminal 702 operates as the control station (906) and the network is changed over to communication based upon control by the wireless terminal 702 operating as the control station. The sequence from this point onward is executed in a manner similar to the first embodiment and the wireless terminal 703 shifts to the power-saving state.

Third Embodiment

Next, a third embodiment according to the present invention will be described in detail with reference to the drawings.

In processing according to a third embodiment of the invention, the wireless terminal of a control station being driven by a battery senses consumption of the battery, performs handover to another wireless terminal that is being driven by AC power and continues communication. This processing will now be described.

The structure of a wireless terminal in the third embodiment is similar to that of the first embodiment described above with reference to FIGS. 1 and 2 and need not be described again.

Figure 7A:
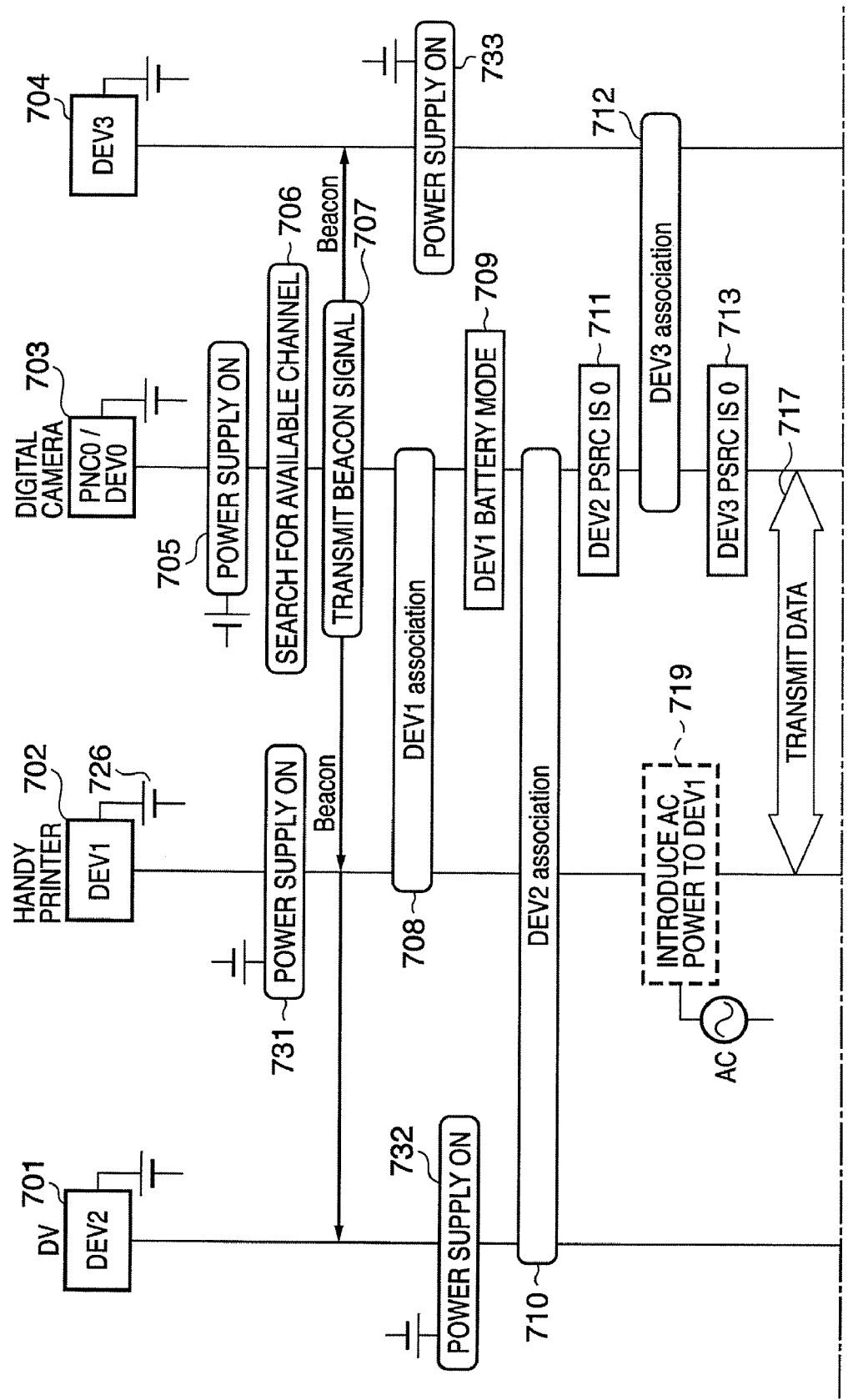
FIGS. 7A and 7B are diagrams illustrating the sequence of PNC handover processing among wireless terminals according to a third embodiment of the present invention.
Figure 7B:
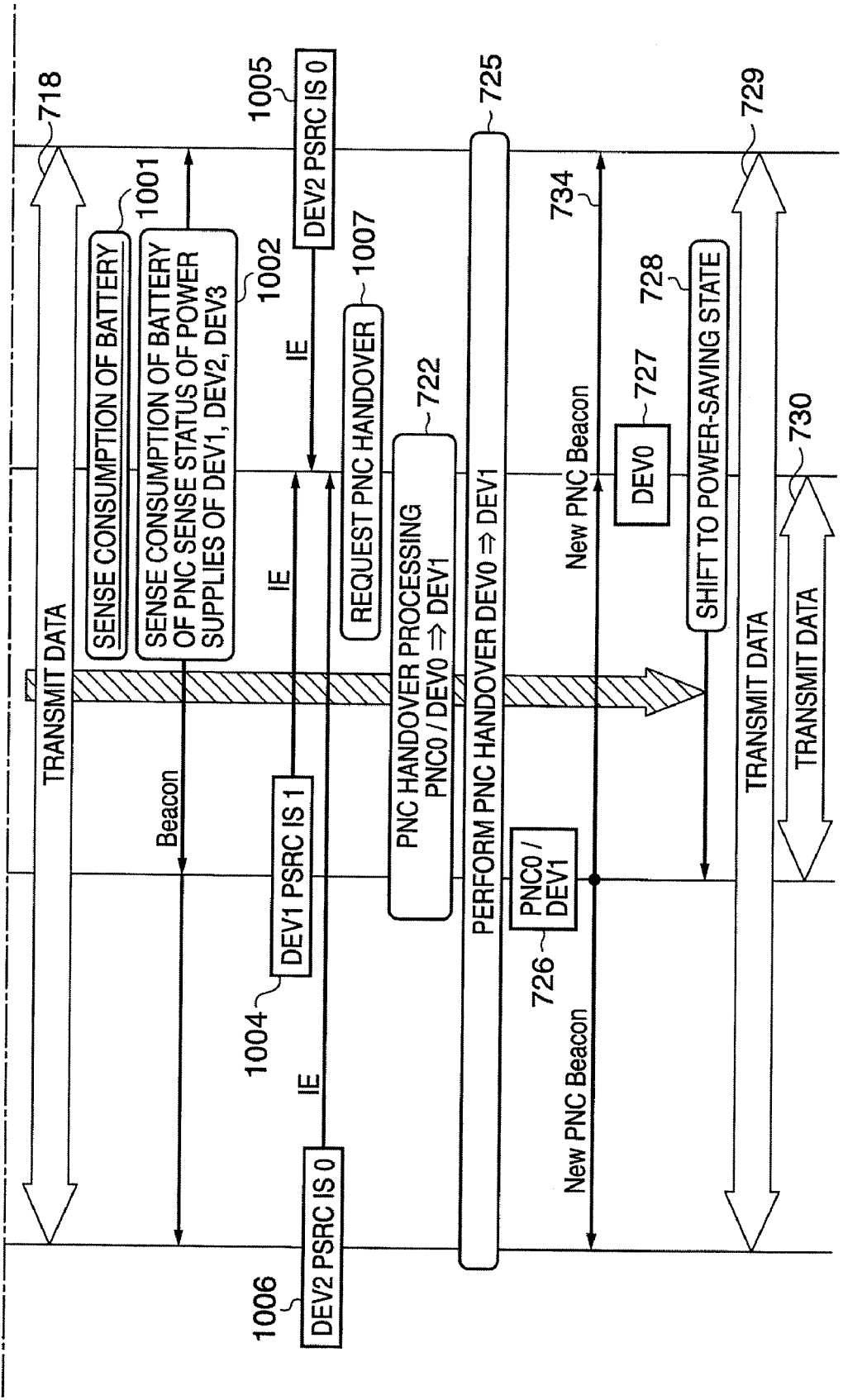

FIGS. 7A and 7B are diagrams illustrating the sequence of processing for performing control-station handover between wireless terminals in the third embodiment. The sequence illustrated in FIGS. 7A and 7B is basically the same as that of the first embodiment shown in FIGS. 4A and 4B, the difference being whether the handover request is issued by the wireless terminal 702 or by the wireless terminal 703.

As in the first embodiment, the wireless terminals 702, 701, 704 associate with the wireless terminal 703 driven by the battery and operating as the control station (708, 710, 712, respectively). If while performing data communication (717, 718) the wireless terminal 703 of the control station judges that this data communication has been in progress for a long period of time, the terminal detects the remaining capacity of the battery (1001) using the power supply detector 519 of the power supply unit 516. If it is judged that the remaining capacity is less than a certain value and that it is necessary to transfer the control station to another wireless terminal, then the wireless terminal 703 notifies the currently associated wireless terminals 702, 701, 704 of the fact that there is little battery capacity left and requests the status of the power supply of each of these terminals (1002).

The wireless terminal 702 is being supplied with AC power (719) before it is notified by the wireless terminal 703 of the fact that there is little battery capacity left. When the status of its power supply is requested by the wireless terminal 703, the wireless terminal 702 notifies the wireless terminal 703 of the fact that it is being supplied with AC power (1004). When the status of their power supplies is requested by the wireless terminal 703, the wireless terminals 701, 704 notify the wireless terminal 703 of the fact that they are operating on battery power (1005, 1006). In response to being so notified, the wireless terminal 703 is capable of determining the latest power-supply information 802 from each wireless terminal. On the basis of latest power-supply information 802 received, the wireless terminal 703 recognizes that the wireless terminal 702 is operating on AC power. Accordingly, the wireless terminal 703 requests the wireless terminal 702 to perform processing for handover of the control station (1007). The sequence from this point onward is performed in a manner similar to that of the first embodiment. After control is handed over to the wireless terminal 702, the wireless terminal 703 shifts to the power-saving state.

It should be noted that the timing at which AC power is introduced at the wireless terminal 702 may be before the start of data communication (717). AC power may be introduced in response to the request for the status of the power supply.

Fourth Embodiment

Next, a fourth embodiment according to the present invention will be described in detail with reference to the drawings.

In processing according to a fourth embodiment of the invention, the wireless terminal operating as the control station detects the status of the power supply of another wireless terminal after data communication with the other wireless terminal ends, and then requests handover in accordance with the result of detection. This processing will now be described.

The structure of a wireless terminal in the fourth embodiment is similar to that of the first embodiment described above with reference to FIGS. 1 and 2 and need not be described again.

Figure 8A:
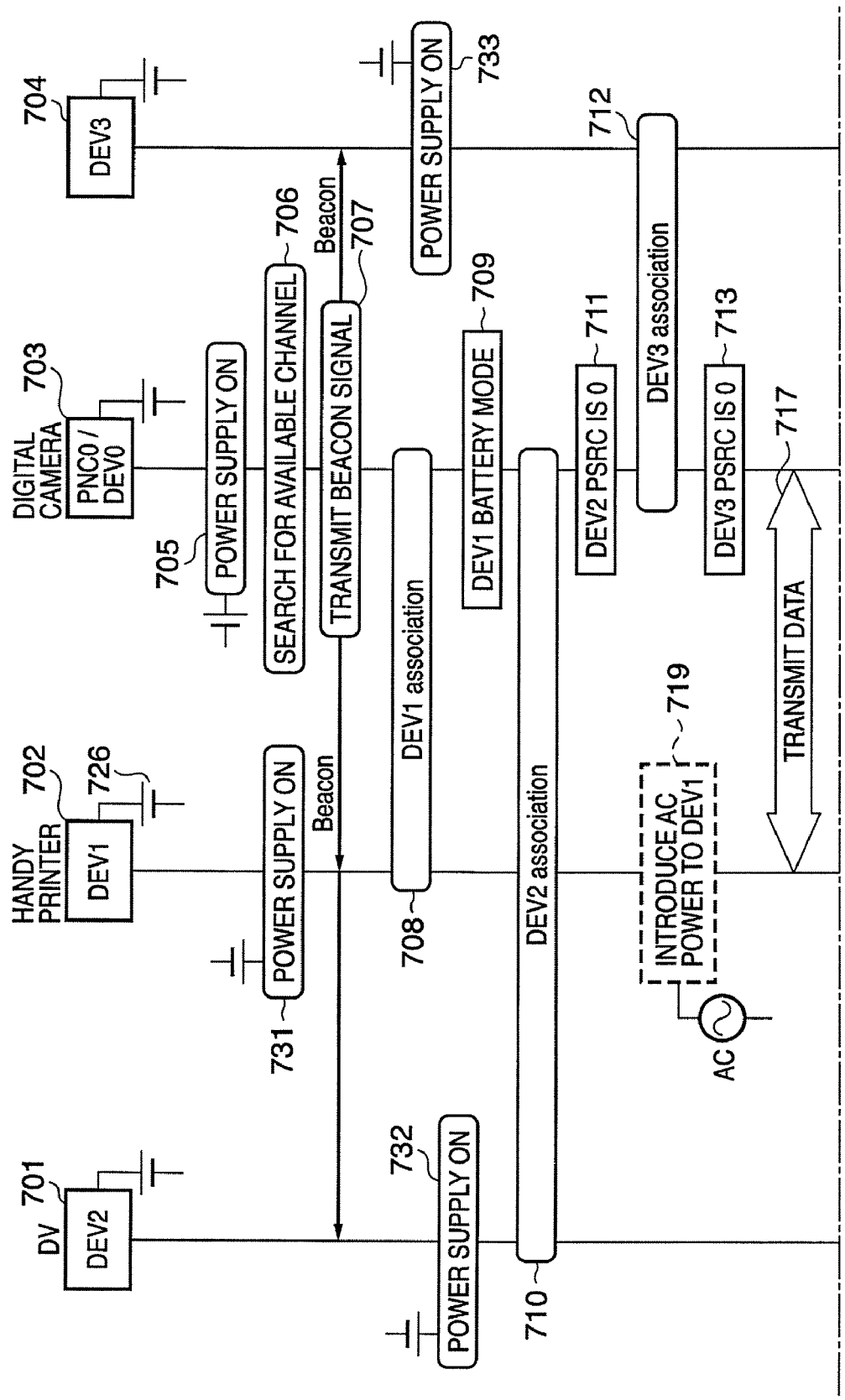

FIGS. 8A and 8B are diagrams illustrating the sequence of processing for performing control-station handover between wireless terminals in the fourth embodiment. The sequence illustrated in FIGS. 8A and 8B is basically the same as that of the third embodiment shown in FIGS. 7A and 7B.

As in the third embodiment, the wireless terminals 702, 701, 704 associate with the wireless terminal 703 driven by the battery and operating as the control station (708, 710, 712, respectively). Thereafter, if the wireless terminal 703 terminates its own data communication (717) or determines that the frequency of communication is lower than that of communication between the other wireless terminals 701, 704 (1101), then the wireless terminal 703 requests the other wireless terminals for the status of their respective power supplies (1002). The sequence from this point onward is performed in a manner similar to that of the third embodiment. After control is handed over to the wireless terminal 702, the wireless terminal 703 shifts to the power-saving state.

Fifth Embodiment

Next, a fifth embodiment according to the present invention will be described in detail with reference to the drawings.

In processing according to a fifth embodiment of the invention, the wireless terminal 703 operating as the control station is started up by AC power and then is switched over to the battery, at which time the wireless terminal 703 detects the status of the power supply of another wireless terminal and then requests handover in accordance with the result of detection. This processing will now be described.

The structure of a wireless terminal in the fifth embodiment is similar to that of the first embodiment described above with reference to FIGS. 1 and 2 and need not be described again.

FIGS. 9A and 9B are diagrams illustrating the sequence of processing for performing control-station handover between wireless terminals in the fifth embodiment. The sequence illustrated in FIGS. 9A and 9B is basically the same as that of the third and fourth embodiments shown in FIGS. 7 and 8.

In the fifth embodiment, first AC power is introduced to the wireless terminal 703 (1201) and the wireless terminal 703 starts operating as the control station. This is followed by executing the sequence up to data communication (717, 718) in a manner similar to the third and fourth embodiments.

When the wireless terminal 703 of the control station has its power supply changed over to the battery (1202), the wireless terminal 703 requests the other wireless terminal for the status of their respective power supplies (1002). The sequence from this point onward is performed in a manner similar to that of the third and fourth embodiments. After control is handed over to the wireless terminal 702, the wireless terminal 703 shifts to the power-saving state.

In accordance with the first to fifth embodiments, control is transferred to the terminal for which stable AC power has been acquired, and a transition to the power-saving state is made. Even if use is made of a battery having little capacity or little remaining capacity, continuous communication time can be prolonged and interruption of communication can be prevented.

Further, it is possible to prevent interruption of communication with another communicating wireless terminal that belongs to the same piconet.

The present invention may be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium storing the program codes of the software for performing the functions of the foregoing embodiments to a system or an apparatus, reading the program codes with a computer (e.g., a CPU or MPU) of the system or apparatus from the recording medium, and then executing the program codes.

In this case, the program codes per se read from the recording medium implement the novel functions of the embodiments and the recording medium storing the program codes constitutes the invention.

Examples of recording media that can be used for supplying the program code are a flexible disk, hard disk, optical disk, magneto-optical disk, CD-ROM, CD-R, magnetic tape, non-volatile type memory card or ROM, etc.

Further, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the recording medium are written to a memory provided on a function expansion board inserted into the computer or in a memory provided in a function expansion unit connected to the computer, a CPU or the like contained in the function expansion board or function expansion unit performs a part of or the entire process based upon the designation of program codes and implements the functions of the above embodiments.

In accordance with the present invention, when a communication apparatus is operating as a control station on a network, the control station is transferred to another communication apparatus depending upon the status of the power supply of the other communication apparatus participating in this network. As a result, continuous communication time can be prolonged and interruption of communication can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-168116, filed Jun. 16, 2006, which is hereby incorporated by reference herein in its entirety.

What is claimed is:

1. A communication apparatus, comprising:
    a determination device configured to determine whether a remaining capacity of a battery is less than a predetermined capacity;
    a requesting device configured to, in a case where the communication apparatus is operating as a control station of a network, request each other communication apparatus participating in the network to transmit a power supply status in a case where the determination device determines that the remaining capacity of the battery is less than the predetermined capacity;
    a recognition device configured to recognize, from a power supply status, a type of power supply for each other communication apparatus participating in the network from received power supply statuses; and
    a handover device configured to execute processing for handing over operation of the control station to another communication apparatus participating in the network in a case where the recognition device recognizes the type of power supply of the another communication apparatus as a commercial power supply,
    wherein the recognition device recognizes the type of power supply of the another communication apparatus as a battery power supply before the determination device determines that the remaining capacity of the battery of the communication apparatus is less than the predetermined capacity and subsequently recognizes the type of power supply of the another communication apparatus as a commercial power supply after the determination device determines that the remaining capacity of the battery of the communication apparatus is less than the predetermined capacity.

2. The communication apparatus according to claim 1, wherein the handover device requests the another communication apparatus to execute processing for handing over operation of the control station to the another communication apparatus.

3. The communication apparatus according to claim 2, wherein the request from the handover device further includes a request to the another communication apparatus to issue a handover request to the handover device, wherein the handover request issued by the another communication apparatus is to execute processing for handing over operation of the control station to the another communication apparatus.

4. The communication apparatus according to claim 1, wherein the communication apparatus shifts to a power-saving state after the handover device hands over operation of the control station to the another communication apparatus.

5. The communication apparatus according to claim 4, further comprising:
    a MAC device; and
    a power-saving mode transition device configured to cause the MAC device to shift to a power-saving mode as part of the power-saving state.

6. The communication apparatus according to claim 1, wherein, in a case where the communication apparatus is operating as a control station of a network, the requesting device further is configured to notify each other communication apparatus participating in the network, in conjunction with a request to transmit a power supply status, that the remaining capacity of the battery of the communication apparatus is less than the predetermined capacity.

7. The communication apparatus according to claim 6, wherein the recognition device recognizes the type of power supply of the another communication apparatus as a battery power supply before the requesting device notifies the another communication apparatus that the remaining capacity of the battery of the communication apparatus is less than the predetermined capacity and subsequently recognizes the type of power supply of the another communication apparatus as a commercial power supply after the requesting device notifies the another communication apparatus that the remaining capacity of the battery of the communication apparatus is less than the predetermined capacity.

8. The communication apparatus according to claim 1, wherein the request to each other communication apparatus to transmit a power supply status is configured to cause a commercial power supply to be introduced into each other communication apparatus.

9. The communication apparatus according to claim 1, wherein the determination device further is configured to determine a period of time over which data communication of the communication apparatuses participating in the network has been in progress and wherein the determination device further is configured to decide whether to determine the remaining capacity of the battery as a function of a determined period of time.

10. The communication apparatus according to claim 1, wherein the handover device further is configured to not execute processing for handing over operation of the control station to another communication apparatus participating in the network in a case where the recognition device does not recognize a commercial power supply as a type of power supply of any other communication apparatus participating in the network.

11. A method for a communication apparatus, the method comprising:
    determining whether a remaining capacity of a battery is less than a predetermined capacity;
    requesting, in a case where the communication apparatus is operating as a control station of a network, each other communication apparatus participating in the network to transmit a power supply status in a case where it is determined that the remaining capacity of the battery is less than the predetermined capacity;
    recognizing, from a power supply status, a type of power supply for each other communication apparatus participating in the network from received power supply statuses; and
    executing processing for handing over operation of the control station to another communication apparatus participating in the network in a case where the type of power supply of the another communication apparatus is recognized as a commercial power supply,
    wherein recognizing includes recognizing the type of power supply of the another communication apparatus as a battery power supply before determining that the remaining capacity of the battery of the communication apparatus is less than the predetermined capacity and subsequently recognizing the type of power supply of the another communication apparatus as a commercial power supply after determining that the remaining capacity of the battery of the communication apparatus is less than the predetermined capacity.

12. The method according to claim 11, wherein executing processing includes requesting the another communication apparatus to execute processing for handing over operation of the control station to the another communication apparatus.

13. The method according to claim 12, wherein requesting the another communication apparatus to execute processing for handing over operation of the control station includes requesting the another communication apparatus to issue a handover request to the communication apparatus, wherein the issued handover request is to execute processing for handing over operation of the control station to the another communication apparatus.

14. The method according to claim 11, wherein the communication apparatus shifts to a power-saving state after operation of the control station is handed over to the another communication apparatus.

15. The method according to claim 14, further comprising:
causing the communication apparatus to shift to a power-saving mode as part of the power-saving state.

16. The method according to claim 11, wherein, in a case where the communication apparatus is operating as a control station of a network, requesting includes notifying each other communication apparatus participating in the network, in conjunction with requesting to transmit a power supply status, that the remaining capacity of the battery of the communication apparatus is less than the predetermined capacity.

17. The method according to claim 16, wherein recognizing includes (i) recognizing the type of power supply of the another communication apparatus as a battery power supply before notifying the another communication apparatus that the remaining capacity of the battery of the communication apparatus is less than the predetermined capacity and (ii) subsequently recognizing the type of power supply of the another communication apparatus as a commercial power supply after notifying the another communication apparatus that the remaining capacity of the battery of the communication apparatus is less than the predetermined capacity.

18. The method according to claim 11, wherein requesting each other communication apparatus to transmit a power supply status causes a commercial power supply to be introduced into each other communication apparatus.

19. The method according to claim 11, wherein determining further includes determining a period of time over which data communication of the communication apparatuses participating in the network has been in progress and deciding whether to determine the remaining capacity of the battery as a function of a determined period of time.

20. The method according to claim 11, wherein executing processing further includes not executing processing for handing over operation of the control station to another communication apparatus participating in the network in a case where a commercial power supply is not recognized as a type of power supply of any other communication apparatus participating in the network.

21. A non-transitory computer-readable medium storing a program for causing a communication apparatus to perform a method comprising:
determining whether a remaining capacity of a battery is less than a predetermined capacity;
requesting, in a case where the communication apparatus is operating as a control station of a network, each other communication apparatus participating in the network to transmit a power supply status in a case where it is determined that the remaining capacity of the battery is less than the predetermined capacity;
recognizing, from a power supply status, a type of power supply for each other communication apparatus participating in the network from received power supply statuses; and
executing processing for handing over operation of the control station to another communication apparatus participating in the network in a case where the type of power supply of the another communication apparatus is recognized as a commercial power supply,
wherein recognizing includes recognizing the type of power supply of the another communication apparatus as a battery power supply before determining that the remaining capacity of the battery of the communication apparatus is less than the predetermined capacity and subsequently recognizing the type of power supply of the another communication apparatus as a commercial power supply after determining that the remaining capacity of the battery of the communication apparatus is less than the predetermined capacity.

* * * * *